(12) United States Patent
Bonnifait et al.

(10) Patent No.: US 7,889,764 B2
(45) Date of Patent: Feb. 15, 2011

(54) METHOD FOR THE SYNCHRONIZATION OF DATA, SUCH AS DISTRIBUTED DATA, TAKING ACCOUNT OF CLOCK DRIFTS AND INACCURACIES

(75) Inventors: Philippe Bonnifait, La Croix Saint Ouen (FR); Paul François Pierre Crubille, Pierrefonds (FR); Véronique Cherfaoui, Beauvais (FR); Hadji Amadou Gning El, Compiegne (FR); Mohamed Shawky, La Croix Saint Ouen (FR); Olivier Michel Bezet, Argent sur Sauldre (FR); Géry Brissot, Chelles (FR)

(73) Assignees: Centre National de la Recherche Scientifique (CNRS), Paris (FR); Universite de Technologie de Compiegne (UTC), Compiegne (FR)

( * ) Notice: Subject to any disclaimer, the term of this patent is extended or adjusted under 35 U.S.C. 154(b) by 888 days.

(21) Appl. No.: 10/598,442

(22) PCT Filed: Feb. 17, 2005

(86) PCT No.: PCT/FR2005/000379

§ 371 (c)(1),
(2), (4) Date: Jun. 13, 2007

(87) PCT Pub. No.: WO2005/096123

PCT Pub. Date: Oct. 13, 2005

(65) Prior Publication Data

US 2007/0297457 A1    Dec. 27, 2007

(30) Foreign Application Priority Data

Mar. 3, 2004   (FR)   ................................. 04 02189

(51) Int. Cl.
*H04J 3/06*   (2006.01)
*H04L 7/00*   (2006.01)
(52) U.S. Cl. .................. 370/503; 370/519; 375/354
(58) Field of Classification Search ................ 370/235, 370/503, 519
See application file for complete search history.

(56) References Cited

U.S. PATENT DOCUMENTS

| 6,278,694 B1 * | 8/2001 | Wolf et al. ............... 370/253 |
| 7,668,099 B2 * | 2/2010 | Agnoli et al. ............ 370/235 |
| 2002/0150189 A1 | 10/2002 | Srinivas et al. |

FOREIGN PATENT DOCUMENTS

| EP | 0 042 924 A | 1/1982 |
| EP | 1 380 918 A | 1/2004 |

* cited by examiner

*Primary Examiner*—Steven H Nguyen
(74) *Attorney, Agent, or Firm*—Alston & Bird LLP

(57) ABSTRACT

The present invention relates to a method for creating a correspondence between the local time of a first machine (B), having a first clock ($H_B$), and that of a second machine (A), having a second clock ($H_A$).

The invention also relates to a method of synchronization between data recorded and date stamped by said first machine (B) with respect to the local time of said second machine (A). In order to make it more flexible and robust, this method does not comprise a synchronization of said clocks ($H_A$, $H_B$), but is based on the establishment of a correspondence 'by intervals' between the times that they indicate. In order to establish correspondence, a non-monotonic temporal reference may be formed by the clock of a synchronous bus connecting, at least temporarily, the two machines (and possibly other devices).

15 Claims, 5 Drawing Sheets

 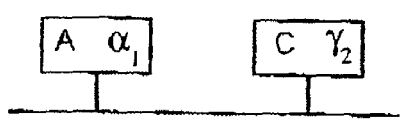
Fig.3A   Fig.3B
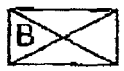 
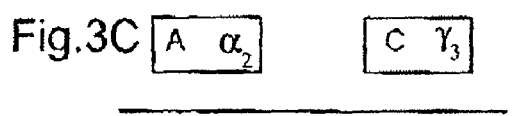 
Fig.3C   Fig.3D
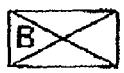 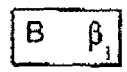
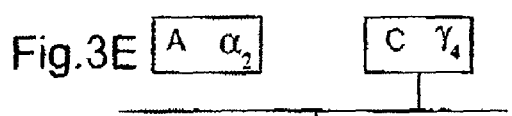 
Fig.3E   Fig.3F
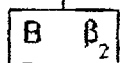 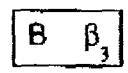
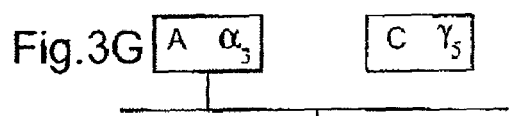 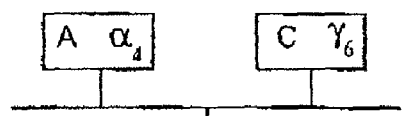
Fig.3G   Fig.3H
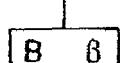 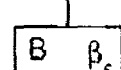
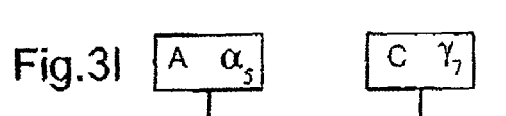 
Fig.3I   Fig.3J
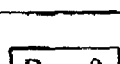 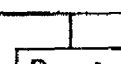
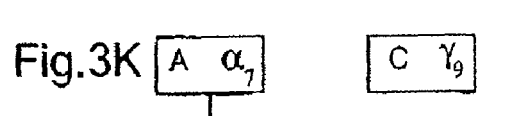 
Fig.3K   Fig.3L
 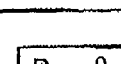

METHOD FOR THE SYNCHRONIZATION OF DATA, SUCH AS DISTRIBUTED DATA, TAKING ACCOUNT OF CLOCK DRIFTS AND INACCURACIES

FIELD AND BACKGROUND OF THE INVENTION

The invention relates to a method for determining a correspondence between the time indicated by the internal clocks of a plurality of machines connected to a network, such as sensors or computers, and also to a method for synchronizing data originating from said machines. These two types of process are intimately linked, the second constituting a direct application of the first.

In this context, 'synchronizing data' signifies ordering them chronologically as a function of their time of acquisition; in a more restricted sense, it also signifies 'date stamping' these same data values with respect to a unique temporal reference. On the other hand, 'synchronizing clocks' signifies forcing the latter to indicate the same time at a given moment.

A method of synchronizing data is necessary, for example, in the field of the validation of automobile driving aid devices. In order to study the effect of these devices on the behavior of a driver, test automobiles are equipped with various sensors connected in a network and allowing information on the vehicle (average speed, acceleration . . . ), on the interaction with other vehicles (distance and relative speed . . . ) and on the behavior of the driver (reaction time, direction of observation . . . ) to be simultaneously acquired. The data values acquired by these various sensors and those recorded by the driving aid devices must be synchronized in order to be exploitable by an ergonomist, and the precision of the synchronization must be better than one millisecond, and preferably better than 100 µs, for data acquisition rates able to reach 1 kHz. At the same time, it is desirable to use standard equipment devices and for the system to be very flexible, allowing the acquisition network to be reconfigured during use, and to be very robust against failures and connection problems.

The most obvious solution to the problem of the synchronization of the data originating from a plurality of devices consists in synchronizing all the clocks. Each device assigns a 'date stamp' to the data values it records and, since the clocks are synchronized between one another, all the date stamps are directly comparable. In this context, the problem of determining a correspondence between the local times is not posed, because all these times substantially coincide.

The synchronization of the clocks may be performed in a hardware or software manner: a general introduction to these techniques is provided in the article by J. A. Fonseca and P. Fonseca, 'An overview of clock synchronization solutions', 4$^{th}$ IFAC International Symposium, Sicica, Argentina, 2000.

The hardware solutions are based on the use of an external clock signal, common to all the devices. In this way, a very high precision can be obtained, for example by the use of an atomic clock, such as that of the GPS system. On the other hand, these solutions have the drawback of requiring dedicated equipment: devices that are not designed to use an external clock signal cannot be connected to the network.

The software solutions comprise the use of software clocks (variables stored in memory) controlled by the 'hardware' clock of each device connected to the network. These software clocks are synchronized in such a manner as to indicate approximately the same time at any moment. Among these solutions, two classes can be further differentiated:

either a single synchronization is performed at the beginning of the session using the network, and it is assumed that the drifts of the clocks can be neglected;

or, re-synchronizations are also performed during use; this is the technique adopted, for example, by the protocol NTP (Network Time Protocol).

As regards the first class of solutions, the assumption of negligible drifts is difficult to verify, at least for acquisition times of several hours and when commercially available computers are used: the clocks of the latter exhibit drifts that may reach 300 µs/s, or over one second per hour. Replacing these clocks by components of better quality equates to a hardware solution that is costly and not very flexible.

The second class of solutions has a difficulty associated with the monotonicity of the clocks. If, for example, a clock has been gaining relative to the reference time, it will be turned back during the re-synchronization. If a first data value has been recorded immediately prior to the moment of re-synchronization and a second data value immediately afterwards, the time stamp of the second recording pre-dates that of the first and the temporal order of the data is reversed. Moreover, the known algorithms that impose the conservation of the monotonicity of time exhibit a relatively slow convergence.

In any case, basing the synchronization of the data on the synchronization of the clocks, or on the use of a single clock, poses limits to the possibilities for reconfiguring the network of devices. Here is a concrete example of a case where the limits of the known techniques of the prior art can be seen. Considering two machines, X and Y, connected to the same network and whose clocks are kept synchronous by a hardware or software method. At a given moment, the machine Y is disconnected from the network, purposely or because of a connection problem, but continues to record data; finally, the machine Y is reconnected after a certain lapse of time. It can easily be understood that it is not possible to order the data acquired during the period of disconnection chronologically, because the synchronization between the clocks of the machines X and Y is irretrievably lost. For this reason, these methods of synchronization are very sensitive to potential network connection problems. In addition, if during the period of disconnection the machine Y had been connected to a second network also comprising a machine Z, there would be no means of synchronizing the data recorded by X with those recorded by Z. The reconnection of the machine Y is also problematic, especially if it is desired that the monotonicity of its clock be conserved. For this reason, these known synchronization methods pose limits to the possibilities for 'hot' reconfiguration (during operation) of the networks to which they are applied.

Another technique known from the prior art is to use temporal markers in order to establish an approximate correspondence between the device local times whose internal clocks are not synchronized. In this case, the synchronization of the data is most often done retroactively, in other words after the end of the recording session, and for this reason it is sometimes referred to as 're-synchronization' of the data.

Such a case frequently arises in the field of multimedia, where it is for example necessary to synchronize images, acquired by a digital camera, with sounds, acquired by an external microphone. In the field of multimedia, the demands in terms of precision are however fairly modest, errors up to around 33 milliseconds (ms) being undetectable by human beings. Several data synchronization techniques used in multimedia applications are described in the article by G. Blakowski and R. Steinmetz, 'A media synchronization survey:

reference model, specification, and case studies', IEEE J. Selected Areas Commun. 141 (1996), pages 5-35.

These techniques are robust and allow a wide flexibility, but their precision is very limited and insufficient for many applications. Moreover, it is not possible to determine with certainty an upper limit for the amplitude of the synchronization errors committed.

A subject of the present invention is a method for establishing a correspondence between the local times of two or more machines whose clocks are not synchronized.

Another subject of the present invention is such a method, with an improved precision with respect to the prior art.

A further subject of the present invention is such a method, with a known precision modeled by an interval.

A further subject of the present invention is such a method, which is robust against connection problems of the network to which the machines, whose local times are to be made to correspond, are connected.

A further subject of the present invention is such a method, which allows a dynamic reconfiguration of such a network.

A further subject of the present invention is such a method, which allows only standard equipment to be used.

A further subject of the present invention is a method for synchronizing the data recorded by two or more machines, or generated by two or more devices, which does not require synchronization of the clocks of said devices or machines, and which is based on the establishment of a correspondence between the local times of two or more machines whose clocks are not synchronized.

Other objects of the present invention consist in providing such a method with an improved precision relative to the prior art, with a known precision, that is robust against problems of connections of the network to which the machines, whose local times are to be made to correspond, are connected, and/or which allows only standard equipment to be used.

At least one of the aforementioned objects is achieved by means of a method for establishing a correspondence by intervals between the time indicated by a first monotonic clock and the time indicated by a second clock, also monotonic, characterized in that it operates, over at least one temporal range, a first temporal reference common to the first and to the second clock and monotonic over said range, and in that said method comprises the steps of:

a) determining a first temporal interval bounded by a first pair of time values of the first clock and belonging to a first temporal range over which said first temporal reference common to the first and to the second clock exists;

b) determining a second temporal interval bounded by a second pair of time values of the first clock and belonging to a second temporal range over which said first temporal reference common to the first and to the second clock exists;

c) determining, using the common temporal reference, a third temporal interval, bounded by a first pair of time values of the second clock, and containing the first temporal interval;

d) determining, by means of the common temporal reference, a fourth temporal interval, bounded by a second pair of time values of the second clock, and containing said second temporal interval;

e) for any given fifth temporal interval bounded by a third pair of time values of the first clock, calculating a sixth temporal interval, bounded by a third pair of time values of the second clock, and containing said fifth temporal interval, the calculation being performed by interpolation or extrapolation using said first, second, third and fourth intervals.

In one particular embodiment of the invention, the step c) comprises the operations of:

c1) determining a seventh and of an eighth temporal interval, bounded by a fourth and fifth pair of time values of the second clock, respectively, and belonging to the first temporal range, such that the first temporal interval falls in the range between said seventh and eighth temporal intervals;

c2) determining a first, second and third value of the first common temporal reference, included in said first, seventh and eighth temporal intervals, respectively;

c3) calculating, by interpolation, said third temporal interval, using said first, seventh and eighth temporal intervals and said first, second and third values of the first common temporal reference;

and the step d) comprises the operations of:

d1) determining a ninth and of a tenth temporal interval, bounded by a sixth and seventh pair of time values of the second clock, respectively, and belonging to the second temporal range, such that said second temporal interval falls in the range between said ninth and tenth intervals;

d2) determining a fourth, fifth and sixth value of the first common temporal reference, included in said second, ninth and tenth temporal intervals, respectively;

d3) calculating, by interpolation, said fourth temporal intervals, using said second, ninth and tenth temporal intervals and said fourth, fifth and sixth values of the first common temporal reference.

Preferably, the operation c3) is carried out by replacing said first, second and third values of the common temporal reference by temporal intervals whose width is equal to the discretization of the first common temporal reference over the first temporal range, and the operation d3) is carried out by replacing said fourth, fifth and sixth values of the common temporal reference by temporal intervals whose width is equal to the discretization of the first common temporal reference over the second temporal range.

Advantageously, during the temporal range or ranges over which a first common temporal reference exists, a first reading of the first clock is recorded several times, followed by a reading of the first common temporal reference and, subsequently, by a second reading of the first clock, and independently, a first reading of the second clock is recorded, also several times, followed by a reading of the first common temporal reference and then by a second reading of the second clock, and the operations c1), c2), c3), d1), d2) and d3) are performed using these recordings.

In another particular embodiment of the invention, the step c) comprises the operations of:

c1) determining a seventh and an eighth time value of the second clock belonging to the first temporal range, such that said first temporal interval falls in the range between said seventh and eighth values;

c2) determining a first, second and third interval of values of the first common temporal reference, comprising said first temporal interval and said seventh and eighth time values of the second clock, respectively;

c3) calculating, by interpolation, said third temporal interval, using said first interval of time values of the first clock, said seventh and eighth time values of the second clock and said first, second and third intervals of values of the first common temporal reference;

and the step d) comprises the operations of:

d1) determining ninth and tenth time values of the second clock belonging to the second temporal range, such that said second temporal interval falls in the range between said ninth and tenth values;

d2) determining fourth, fifth and sixth intervals of values of the first common temporal reference, comprising said second temporal interval and said ninth and tenth time values of the second clock;

d3) calculating, by interpolation, said fourth temporal interval, using said second interval of time values of the first clock, said ninth and tenth time values of the second clock and said fourth, fifth and sixth intervals of values of the first common temporal reference.

Preferably, the operations c3) and d3) are carried out by replacing said seventh, eighth, ninth and tenth time values of the second clock by temporal intervals whose width is equal to the discretization of the time of the second clock.

Advantageously, during the temporal range or ranges over which a first common temporal reference exists, a first reading of the first common temporal reference is recorded several times, followed by a reading of the first clock and, subsequently, by a second reading of the first common temporal reference, and independently, a first reading of the first common temporal reference is recorded, also several times, followed by a reading of the second clock and then by a second reading of the first common temporal reference, and the operations c1), c2), c3), d1), d2) and d3) are performed using these recordings.

In particular embodiments of the invention, the aforementioned calculations by interpolation or extrapolation are, more precisely, interpolations or extrapolations that are linear or linear by intervals.

Advantageously, when the first temporal reference common to the first and to the second clock exists over at least two separate temporal ranges and can comprise a rupture in monotonicity from one temporal range to the other, a second monotonic common temporal reference is used in order to resolve the ambiguities resulting from the non-monotonicity of the first common temporal reference.

The invention also relates to a method for synchronizing data recorded and date stamped by a first machine, having a first clock, with respect to the local time of a second machine, having a second clock, characterized in that the date stamping is carried out by associating with each data value recorded by the first machine a fifth temporal interval, bounded by a third pair of time values of the first clock, and in that the synchronization is performed by determining, using a method such as that described hereinabove, a sixth temporal interval, bounded by a third pair of time values of the second clock and containing said fifth temporal interval.

In a particular embodiment of such a data synchronization method, the first common temporal reference is supplied by the clock of a synchronous bus which connects, at least temporarily, said first and second machines.

In a particular embodiment of the invention, such a data synchronization method may be broken down into a first sub-process for recording clock readings, such as that described hereinabove, carried out locally by each machine whose data it is desired to synchronize, and a second process for the synchronization itself, effected by a single machine toward which all the data has been transferred after the termination of the data recording session.

BRIEF DESCRIPTION OF THE DRAWINGS

Other features, details and advantages of the invention will become apparent upon reading the description presented with reference to the appended drawings, given by way of example and in which:

FIGS. 2, 3A-3L, 4 and 5, together with tables Tab.A, Tab.B and Tab.C, illustrate by a concrete example a method forming one embodiment of the invention.

DETAILED DESCRIPTION

Figure 1B:
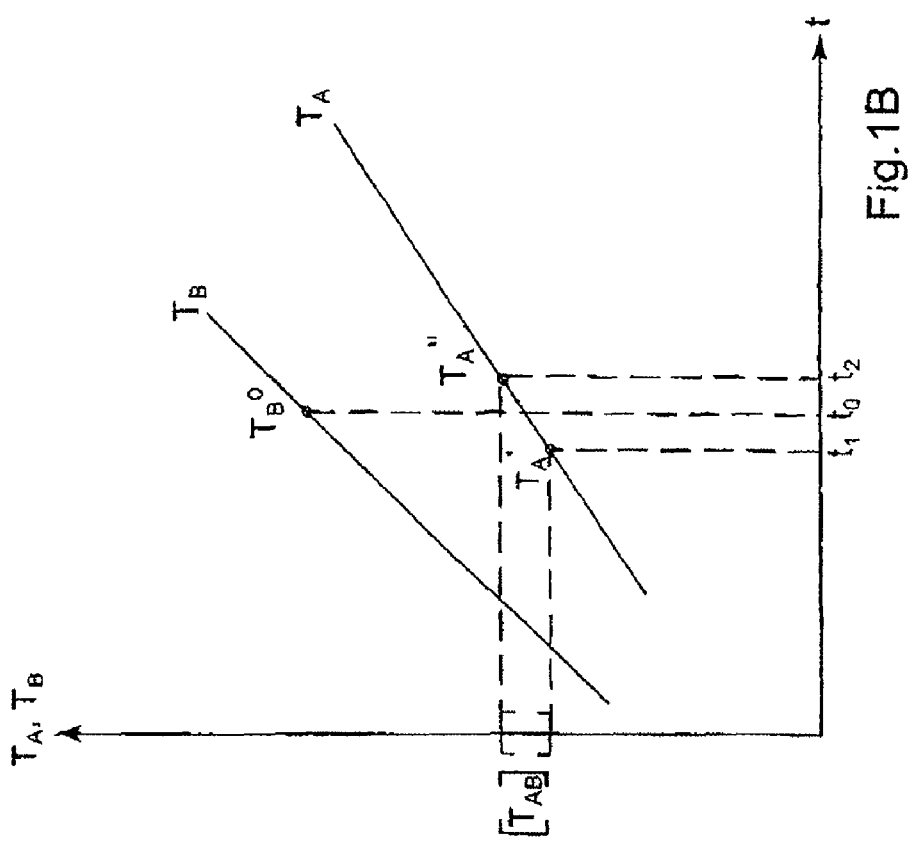
FIGS. 1A and 1B illustrate a manner in which to proceed for the determination of a correspondence between the times indicated by two different and non-synchronized clocks.

Before continuing with the description, it is appropriate to define precisely certain terms and notations used in the following description.

By 'true time' is understood physical time, which cannot be precisely known and of which the clocks only give an approximation; in this document, 't' indicates a true time value.

By 'clock' is understood a digital clock, formed by an oscillator coupled to a counter. At each cycle of the oscillator, the counter is incremented by a discrete quantity $\delta$ (discretization or quantization). Consequently, the plot of the time measured by a clock with respect to true time takes the form of a staircase, with steps of height $\delta$. The counter of a clock necessarily has a finite capacity and is reset to zero when this is exceeded. Clocks can nevertheless have a capacity that is sufficiently large for this problem to be neglected.

A 'synchronous bus' is a bus over which a clock signal is broadcast.

By 'local time' of a machine is understood the time measured by the clock of this machine. A local time value is indicated by 'T'.

By 'date stamp' of a data value recorded by a machine is understood either the time read on the clock of the machine at the moment the data value is recorded, or the interval included between two readings of this clock, carried out before and after said recording. Any ambiguity will be removed by the context and by the notation: thus, the date stamp indicated by [T] is, in fact, the interval included between $\underline{T}$ and T, with $\underline{T}<$ T. In reality, any date may be considered as an interval: even if it is known with certainty that it was the value indicated by the clock of the machine at the moment a data value was recorded, there remains an indetermination $\delta$ due to the discretization of said clock.

By 'monotonicity' is understood the property of a clock such that if $t_1<t_2$, then $T(t_1)<T(t_2)$.

By 'offset' is understood the difference between the time indicated by two clocks at a given moment, or between the time on a clock and true time. The offset between two times defined by means of intervals is also an interval: if $[T_A]=[\underline{T}_A, T_A]$, $T_A]$ and $[T_B]=[\underline{T}_B, T_B]$, then the offset allowing the passage from $[T_B]$ to $[T_A]$ is equal to:

$$[\text{off}_{AB}]=[\underline{\text{off}}_{AB},\overline{\text{off}_{AB}}]=[\underline{T}_A-T_B, T_A-\underline{T}_B] \qquad (1)$$

such that $[T_A]=[T_B]+[\text{off}_{AB}]$.

By 'drift' between two clocks, or one clock and true time, is understood the derivative of the offset with respect to local time of one of the clocks or of true time. Unless otherwise stated, in this document it is considered that, for each pair of clocks, the drift is constant over time and that, consequently, the offset is a linear function of time (linear drift hypothesis). In this case, the drift can be calculated by knowing two offsets determined at different dates. If the offsets and/or the date stamps are intervals, the drift is also an interval:

$$[drift_{AB}] = [\underline{drift_{AB}}, \overline{drift_{AB}}] = \frac{[off_{AB}^2] - [off_{AB}^1]}{[T_B^2] - [T_B^1]} \quad (2)$$

in the sense of the calculation by intervals.

The exponents 1 and 2 refer to the first and to the second date at which an offset is determined.

By 'synchronization by intervals of the data of the machine B with respect to the machine A' is understood the determination, for each data value recorded by the machine B with a date stamp $[T_B]$, of an interval $[T_{AB}]$ of the local time of the machine A such that $\underline{T_{AB}}$ precedes the recording of said data value and $\overline{T_{AB}}$ follows it. For the sake of concision, $[T_{AB}]$ is said to be the local time of the machine A that 'corresponds' to $[T_B]$. It is observed that the roles of the two machines are not symmetrical and that, in general, the interval $[T_{AB}]$ is wider than $[T_B]$.

In the following, when the context does not lead to ambiguities, the expression 'synchronization by intervals' is quite simply replaced by 'synchronization'.

By 're-synchronization' is understood more specifically a synchronization carried out after all the data has been recorded.

The 'precision' of a synchronization by intervals is determined by the broadening of $[T_{AB}]$ with respect to $[T_B]$.

The 'precision' of a synchronization process whose purpose is to establish a relationship between instantaneous values of $T_A$ and $T_B$ is the difference between the calculated value of $T_{AB}$ and its 'true' value.

Calculation techniques by intervals are presented in the work 'Applied Interval Analysis', L. Jaulin, M. Kieffer, O. Dirit and E. Walter, Springer-Verlag, 2001, ISBN: 1-85233-219-0.

Figure 1A:
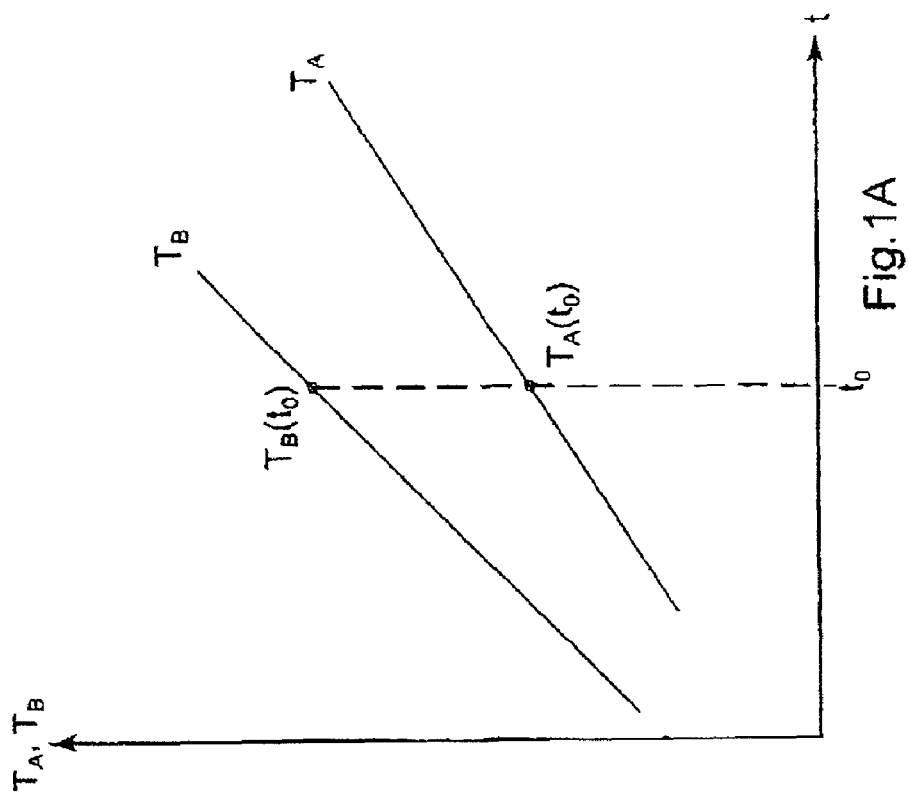

FIGS. 1A and 1B illustrate how the correspondence between the times $T_A$ and $T_B$, indicated by the two clocks A and B, can be determined. For the sake of simplicity, the discretization of the clocks has been neglected ($\delta \rightarrow 0$) and hence the lines $T_A(t)$ and $T_B(t)$, which, in reality, take the form of a staircase, have been approximated by straight lines.

The first possibility, which immediately comes to mind, simply consists in reading the two clocks 'simultaneously' at a time $t_0$ in order to find a correspondence between $T_A(t_0)$ and $T_B(t_0)$. In fact, this 'simultaneous' reading is not possible in the case of real machines; moreover, this reading requires a finite time, which cannot be predetermined and which depends on the transmission times of the data over the lines or bus, together with the latencies of the processors and of the exploitation systems. If the demands on the precision of the synchronization are relatively modest, as in the case of multimedia applications, the imprecision in the time required to perform the double reading may be less than the acceptable margin of error. It is therefore legitimate to ignore the problem and to consider that the two readings are carried out substantially at the same time.

This assumption is not justified if a higher precision is required. Since it is not possible to establish a one-to-one correspondence $T_A \leftrightarrow T_B$, an approach 'by intervals' is therefore adopted, as previously explained. One major advantage of this approach with respect to any technique that tries to determine an approximate equivalence between 'instantaneous' dates is that it allows the uncertainty in the synchronization, which is equal to the width of the interval, to be known exactly.

As illustrated in FIG. 1B, in order to determine a correspondence by intervals between the local times of the machines A and B, firstly, at a time $t_1$, the local time of the machine A, $T'_A$, subsequently, at a time $t_0$, that of the machine B, $T_B$, and lastly, at a time $t_2$, again that of the machine A, $T''_A$ (it should not be forgotten that the exact values of $t_0$, $t_1$ and $t_2$ cannot be known) is read. It can readily be understood that it must be verified that no rupture in monotonicity of the local time of the machine A has occurred between the first and the last reading.

One example of a method according to the invention for determining a correspondence between the times indicated by separate clocks and thus synchronizing data is now described in detail by means of FIGS. 2, 3A-3L, 4 and 5, together with tables Tab.A, Tab.B and Tab.C. For the moment, only a 'retroactive' synchronization (re-synchronization) will be considered, in other words where the data values are synchronized after the termination of the operation session of the system (also called 'data acquisition session' in the following). The case of synchronization in 'real time' (during the operation session of the system) will be considered later on.

Figure 2:
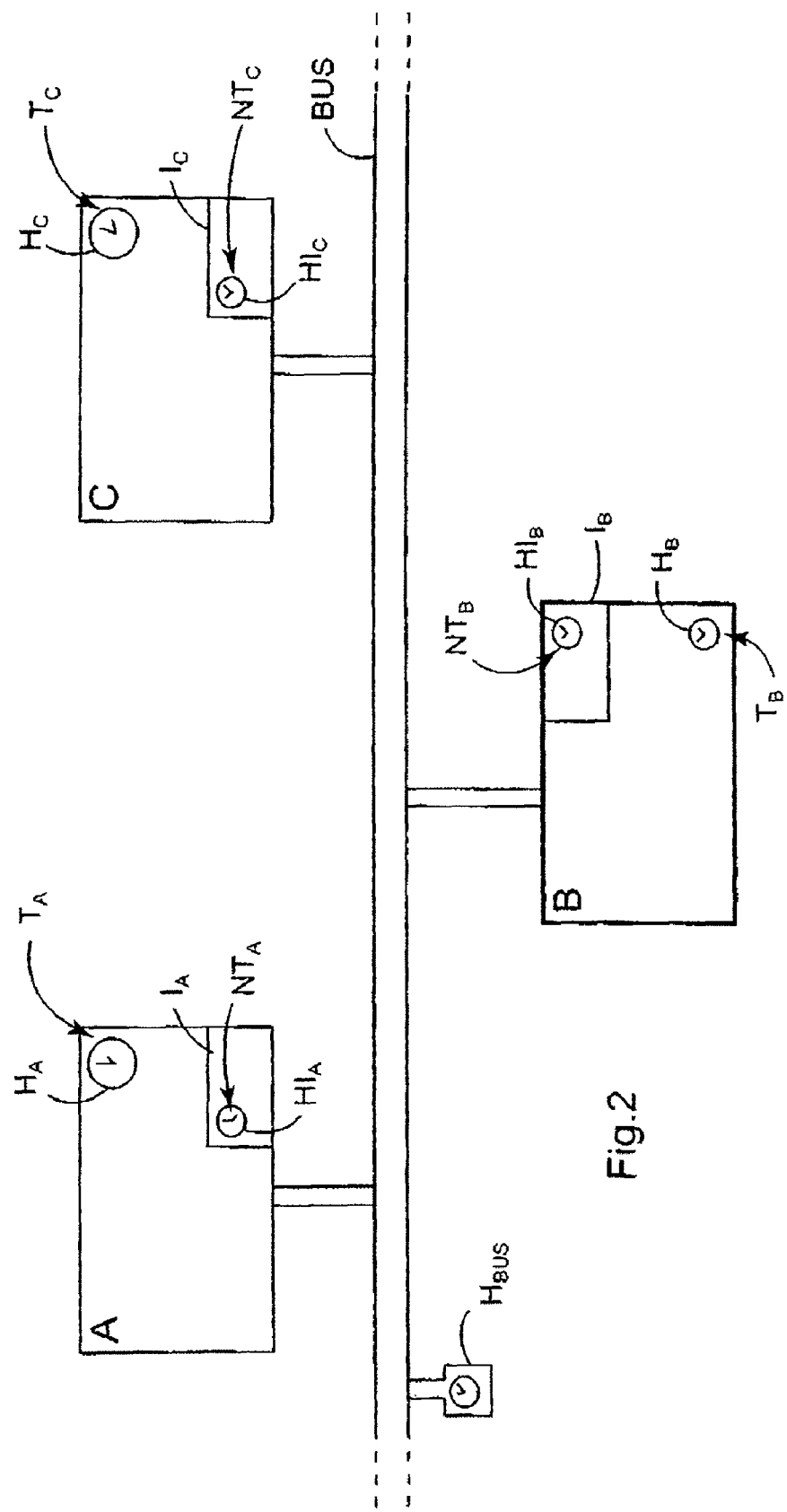

An information system, shown in FIG. 2, comprises three machines, A, B and C, such as computers, each having an internal clock $H_A$, $H_B$ and $H_C$ that measures a local time $T_A(t)$, $T_B(t)$ and $T_C(t)$, respectively, together with a synchronous bus BUS, such as a FireWire® bus (IEEE 1394) having its own clock $H_{BUS}$ with a precision better than 3 μs, in the worst case, according to the IEEE1394a standard.

The machines can be connected and disconnected from the bus BUS independently from one another; each time a reconfiguration of the system occurs (for example, each time a machine is connected or disconnected), an interrupt signal is transmitted over the bus. One of the machines connected to the network is designated as 'reference machine' and its designation is known by the other machines; in the figure, this is machine B, characterized by a bold line contour. The reference machine cannot be considered as a 'master' machine in a centralized system: any machine in the network may be chosen to temporarily assume this function. Indeed, a new reference machine is chosen at random at each interrupt, which allows the operation of the system to be ensured even if the previous reference machine has been disconnected.

Each machine is also equipped with a bus interface $I_A$, $I_B$ and $I_C$, comprising a clock, $HI_A$, $HI_B$ and $HI_C$, respectively, controlled by $H_{BUS}$. The bus clock $H_{BUS}$ is generated by one of the interfaces I (called 'Cycle Master' in the IEEE FireWire standard). The clocks HI are feedback controlled by $H_{BUS}$.

The bus clock $H_{BUS}$ has a counter with limited capacity, which is reset to zero every 128 s, but the interface clocks comprise a software extension having a capacity that is sufficiently large so that over-runs do not occur over the operating duration of the system. The time measured by the interface clock $HI_A$, $HI_B$ and $HI_C$ ('interface time') of the machine A, B and C is indicated by $NT_A(t)$, $NT_B(t)$ and $NT_C(t)$, respectively.

One machine is chosen to 'provide the network time': this means that the interface clocks of all the other machines are synchronized to its clock. At each interrupt, a new machine is chosen for this task and the software extension of the interface clocks is reset to zero: hence, after the interrupt, all the clocks indicate the same time as the bus clock $H_{BUS}$.

It should be noted that the machine providing the network time is not necessarily the reference machine. If a machine is disconnected from the network, it is its own reference machine and its network time is the time on its own interface clock.

It will be understood that the time NT of the network forms a first temporal reference common to all the machines connected to the bus BUS, but is non-monotonic. The time of the reference machine forms a second temporal reference common to all the machines connected to the bus BUS and, moreover, is monotonic. This second temporal reference is nevertheless very imprecise because, in order to know it, a machine other than the reference one must make a request via the bus, which requires a time that is relatively long and which cannot, in principle, be predetermined.

Throughout its operation, each machine records, independently of the others, data values and their date stamp in the form of intervals, for example sensor acquisitions.

At the same time, each machine constructs a file called 'date stamp file' which is formed by a series of rows. The rows are filled out at approximately regular intervals, for example of around one second, and they comprise five fields:

TL1 is a first reading of the local time of the machine;
TR is a reading of the network time;
TL2 is a second reading of the local time of the machine;
NMR is the designation of the reference machine; and
TMR is the local time of the reference machine.

The first three readings must be performed in order such that TR falls between TL1 and TL2.

When an interrupt signal is received, the machine fills out an 'exception row' by assigning to the fields TL1, TR, TL2 and TMR the value 0 and to the field NMR the conventional name 'BUS_RESET'.

The filling out of date stamp files is a low-priority process and relatively undemanding, which does not interfere substantially with the recording and the date stamping of the events.

Once the session is finished, the date stamp files are transferred to one and the same computer and the re-synchronization sub-process itself can be started.

Here, as an example, the specific problem of re-synchronizing the data recorded by the machines A and B is posed.

The tables Tab.A, Tab.B and Tab.C show a part of the date stamp file contents of the machines A, B and C, respectively, henceforth called FHA, FHB and FHC, respectively. Only the two rows that precede and follow each interrupt are shown; in addition, for the sake of clarity and saving space, the field TL2 does not contain the value of the second reading of the local time of the machine, but the difference between the second and the first reading, which is clearly equivalent. The times indicated are in microseconds (μs), but this is not essential to the comprehension of the method.

The interrupts subdivide each file into sections α1-α8, β1-β9 and γ1-γ9, separated by exception rows. It is important to observe that there is an interrupt at each rupture in monotonicity, hence it can be considered that the network time is in fact 'locally' monotonic over each section.

The fields NMR and TMR allow a temporal correspondence to be determined between the sections of the different files. For example, it can be seen that the sections α1 and γ2 have been recorded simultaneously, while the machines A and C were both connected to the bus BUS, with the machine A as reference machine. In this fashion, the 'history' of the system can be reconstructed, as illustrated in FIGS. 3A-3L.

Initially, (FIG. 3A), only the machine C is in operation and it fills out the section γ1 of its date stamp file.

Subsequently, (FIG. 3B), the machine A starts up and the two machines connect to the bus for a certain time (sections α1 and γ2), A being the reference machine.

Then, FIG. 3C, they separate again (sections α2 and γ3).

During this time (FIG. 3D) the machine B goes into operation, but remains disconnected from the network (section β1), hence does not generate an interrupt.

During the fifth period (FIG. 3E, sections α2, β2 and γ4) the machines B and C are connected to the bus, and C is the reference machine. The machine A does not receive the interrupt signal caused by the connection of the machine B, hence it continues to fill out the section α2 of its date stamp file.

During the sixth period, FIG. 3F, the three machines are disconnected from the bus and fill out the sections α2, β3 and γ5 of the respective date stamp files (the machine A, which has already been disconnected, does not receive the interrupt signal caused by the disconnection of B and C).

In FIG. 3G, the machines A and B again connect onto the bus, with A as reference machine, and thus pass on to the sections α3 and β4, whereas the machine C remains disconnected and, since it does not receive an interrupt signal, continues to fill out the section γ5.

Subsequently, FIG. 3H, the three machines are all again connected to the bus (sections α4, β5 and γ6), with B as reference machine.

When the latter (B) is disconnected (FIG. 3I, sections α5, β6 and γ7), A becomes the reference machine. A short time later (FIG. 3J, sections α6, β7 and γ8), B reconnects and again becomes reference machine.

In FIG. 3K, the machine C disconnects (sections α7, β8 and γ9) and A again becomes reference machine.

Finally (FIG. 3L, sections α8 and β9), the machines A and B are also disconnected, after which the history of the system becomes irrelevant.

Thanks to the second temporal reference (TMR), a kind of re-synchronization has thus been performed, which is however very rudimentary because the rows of the date stamp files are filled out at a slow rate. This bringing into correspondence of the sections α, β and γ allows the non-monotonicity of the first temporal reference (NT) to be overcome and allows it to be used to carry out the actual re-synchronization by intervals.

In this example, the case where only one bus is present has been considered.

Coming back to the problem of re-synchronizing the data of the machine B with respect to the time of the machine A, the 'common temporal ranges' must first be determined, in other words the periods during which these two machines were connected to the same network via the bus BUS, which is that of the only network considered in this example. There are four of these ranges: P1, which corresponds to the sections α3 and β4; P2, which corresponds to sections α4 and β5; P3, which corresponds to the sections α6 and β7 and P4, which corresponds to the sections α7 and β8. The ranges P1 and P2, and also P3 and P4, are adjacent to one another, but are separated by an interrupt.

Figure 4:
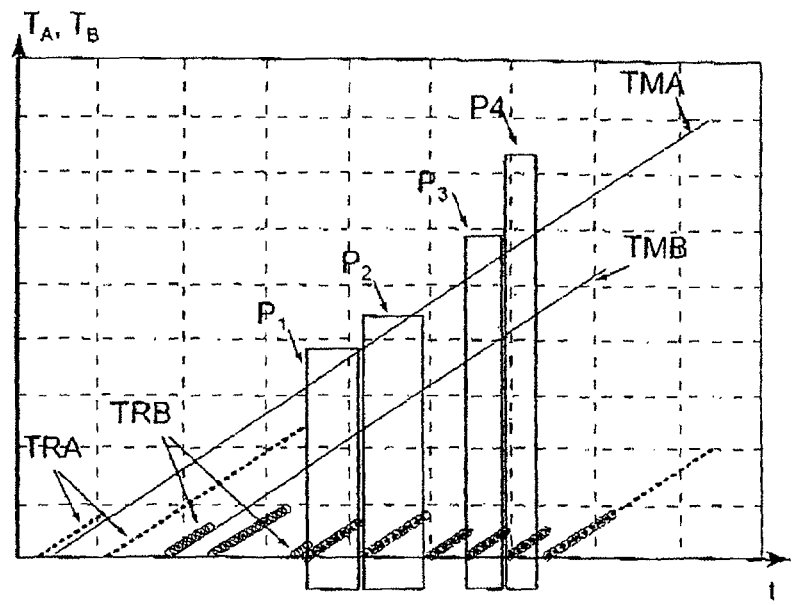

FIG. 4 is a graphical representation of the information contained in the files FHA and FHB (the discretization of the clocks is neglected: the steps corresponding to the discrete increments of the counters are not visible). The ordinate axis carries the local times of the machines A and B and the time of the networks to which said machines are connected, that of the abscissae represents true time. The rows TMA and TMB represent, respectively, the local times of A and of B. The rows TRA (dashed) and TRB (circles) represent the time of the network of A and of B, respectively. The common ranges P1, P2, P3 and P4 are indicated by the shaded regions.

As was explained hereinabove, each data value recorded by the machine B is characterized by a date stamp $[T_B]$, which is an interval included between two readings of the clock $H_B$ surrounding a value of the network time, [NT]. The objective is to determine $[T_{AB}]$, the interval of the local time of the machine A corresponding to $[T_B]$.

Firstly, the case where $[T_B]=[T_B^1]$ is considered, situated inside a common temporal range, for example P1, as illustrated in FIG. 4. The first operation consists in determining two date stamps $[T_{A1}^1]$ and $[T_{A2}^1]$ of the machine A belonging to one and the same range and situated before and after $[T_B^1]$. In fact, these 'date stamps' are intervals determined by the method described with reference to FIG. 1B and corresponding to the network times $[NT_{A1}^1]$ and $[NT_{A2}^1]$, respectively. The assumption of linear drift of the clocks allows $[T_{AB}^1]$ to be calculated by a linear interpolation:

$$[T_{AB}^1] = [T_{A1}^1] + \frac{[NT_B^1] - [NT_{A1}^1]}{[NT_{A2}^1] - [NT_{A1}^1]}([T_{A2}^1] - [T_{A1}^1]) \quad (3)$$

Since all the date stamps are intervals, the result is also an interval. It is clear that equation (3) could not be used if an interrupt, and therefore a rupture in monotonicity of the network time, had occurred between $[NT_{A1}^1]$ and $[NT_{A2}^1]$. For this reason, it was required that $[T_{A1}^1]$ and $[T_{A2}^1]$ belong to the same temporal range.

The offset between the clocks of the machines A and B at the date $[T_B]$ is simply given by:

$$[\text{off}_{AB}^1] = [T_{AB}^1] - [T_B^1] \quad (4)$$

This being the difference between two intervals, the offset is also an interval.

Knowing the offset between the clocks at two different dates, $[T_B^1]$ and $[T_B^2]$, the drift, assumed to be linear, can be determined:

$$[\text{drift}_{AB}] = \frac{[\text{off}_{AB}^2] - [\text{off}_{AB}^1]}{[T_B^2] - [T_B^1]} \quad (5)$$

where $[\text{off}^1]$ and $[\text{off}^2]$ are the values of the offset between the clocks $H_A$ and $H_B$ at the dates $[T_B^1]$ and $[T_B^2]$, respectively.

It is important to observe that the presence of interrupts between $[T_B^1]$ and $[T_B^2]$ does not constitute an obstacle for the application of equation (5), because the network time does not directly appear in the latter. On the contrary, those skilled in the art will easily understand that it is advantageous to maximize the separation between the dates $[T_B^1]$ and $[T_B^2]$: consequently, for $[T_B^1]$, the first date stamp of the range P1 and, for $[T_B^2]$, the last one of the range P4 will be taken.

At this point, all the information required to calculate the correspondence between dates read on the clocks $H_A$ and $H_B$, even outside of the common ranges P1-P4, is available. It can indeed be shown that:

If $[T_B] \subset [T_B^1, T_B^2]$, then:

$$[T_{AB}] = [\underline{T}_{AB}, \overline{T}_{AB}] \quad (6)$$

with:

$$\underline{T}_{AB} = \underline{T}_{AB}^1 + \frac{\underline{T}_B - \overline{T}_B^1}{\underline{T}_B^2 - \overline{T}_B^1}(\underline{T}_{AB}^2 - \overline{T}_{AB}^1); \quad (6.1)$$

and $$\overline{T}_{AB} = \overline{T}_{AB}^1 + \frac{\overline{T}_B - \underline{T}_B^1}{\overline{T}_B^2 - \underline{T}_B^1}(\overline{T}_{AB}^2 - \underline{T}_{AB}^1); \quad (6.2)$$

if $[T_B] \leq [T_B^1]$, then:

$$[T_{AB}] = [T_B] + [T_B^1] + ([T_B] - [T_B^1]) \cdot [\text{drift}_{AB}]; \text{ and} \quad (7)$$

if $[T_B] \geq [T_B^2]$, then:

$$[T_{AB}] = [T_B] + [T_B^2] + ([T_B] - [T_B^2]) \cdot [\text{drift}_{AB}]. \quad (8)$$

$[T_B] \leq [T_B^1]$ is a simplified notation for $\overline{T_B} \leq \overline{T_B^1}$ and $[T_B] \geq [T_B^2]$ for $\underline{T_B} \geq \underline{T_B^2}$.

Figure 5:
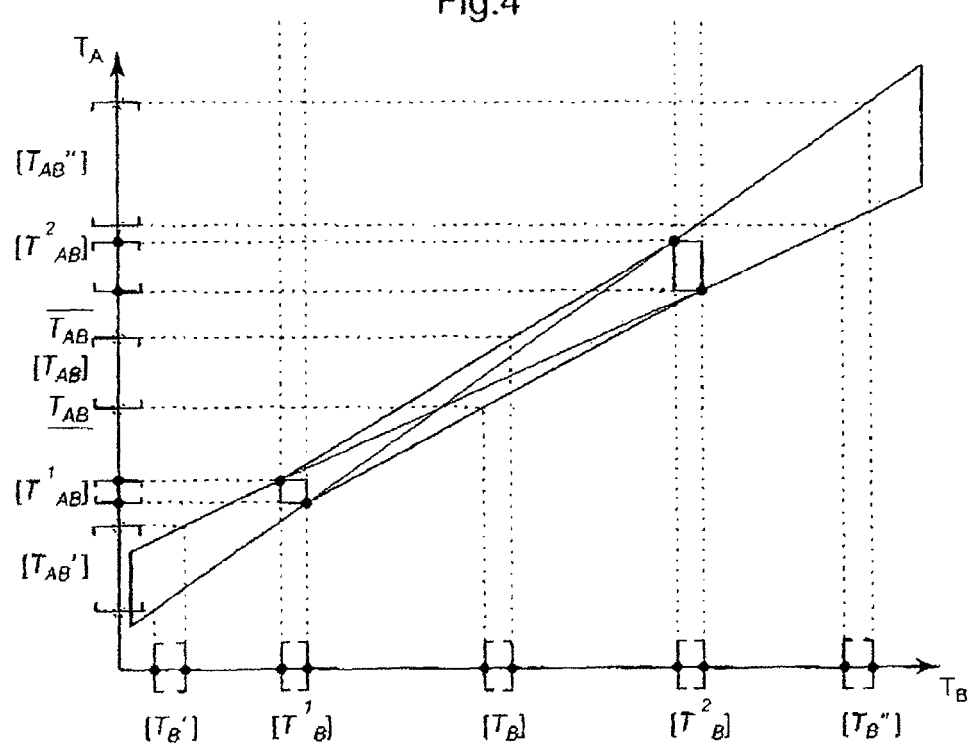

FIG. 5 is a graphical representation of equations 6-8. It can be observed that the width of the interval $[T_{AB}]$, and hence the imprecision in the synchronization, is more or less constant for $[T_B] \subset [T_B^1, T_B^2]$ and increases as it gets further away from this range (intervals $[T_B']$, $[T_{AB}']$ and $[T_B'']$, $[T_{AB}'']$, situated, respectively, before $[T_B^1]$ and after $[T_B^2]$). The advantage of choosing the intervals $[T_B^1]$ and $[T_B^2]$ the furthest apart possible can therefore be understood. On the axes $T_A$ and $T_B$ of FIG. 5, the known times ($\underline{T}_B, \overline{T}_B, \underline{T}_B^1, \overline{T}_B^1, \underline{T}_B^2, \overline{T}_B^2, T''_B, T'''_B, \underline{T}_{AB}^1, \overline{T}_{AB}^1, \underline{T}_{AB}^2$ and $\overline{T}_{AB}^2$) are indicated by a full circle and the unknown times ($T'_{AB}, T''_{AB}, \underline{T}_{AB}, \overline{T}_{AB}, T''_{AB}$ and $T'''_{AB}$) by a dashed circle.

It is interesting to note that the file FHC, after having contributed to bringing the sections α, β and γ into correspondence, is no longer used for the re-synchronization.

The example of a 'hot' reconfiguration of a network discussed hereinabove, which is incompatible with the synchronization methods of the prior art, can now be reconsidered. First of all, it is observed that the reconnection of a machine Y to the network comprising a machine X poses no problem of monotonicity, because the clocks of the machines are never synchronized to one another. Moreover, since both the machine X and the machine Z have been connected to the same network as the machine Y for a part of their history, all the data recorded by these machines can be re-synchronized with those of Y by a method according to the invention. Synchronization of the data values of the machine X with those of the machine Y, albeit with a lower precision, can therefore be indirectly obtained.

Figure 6:
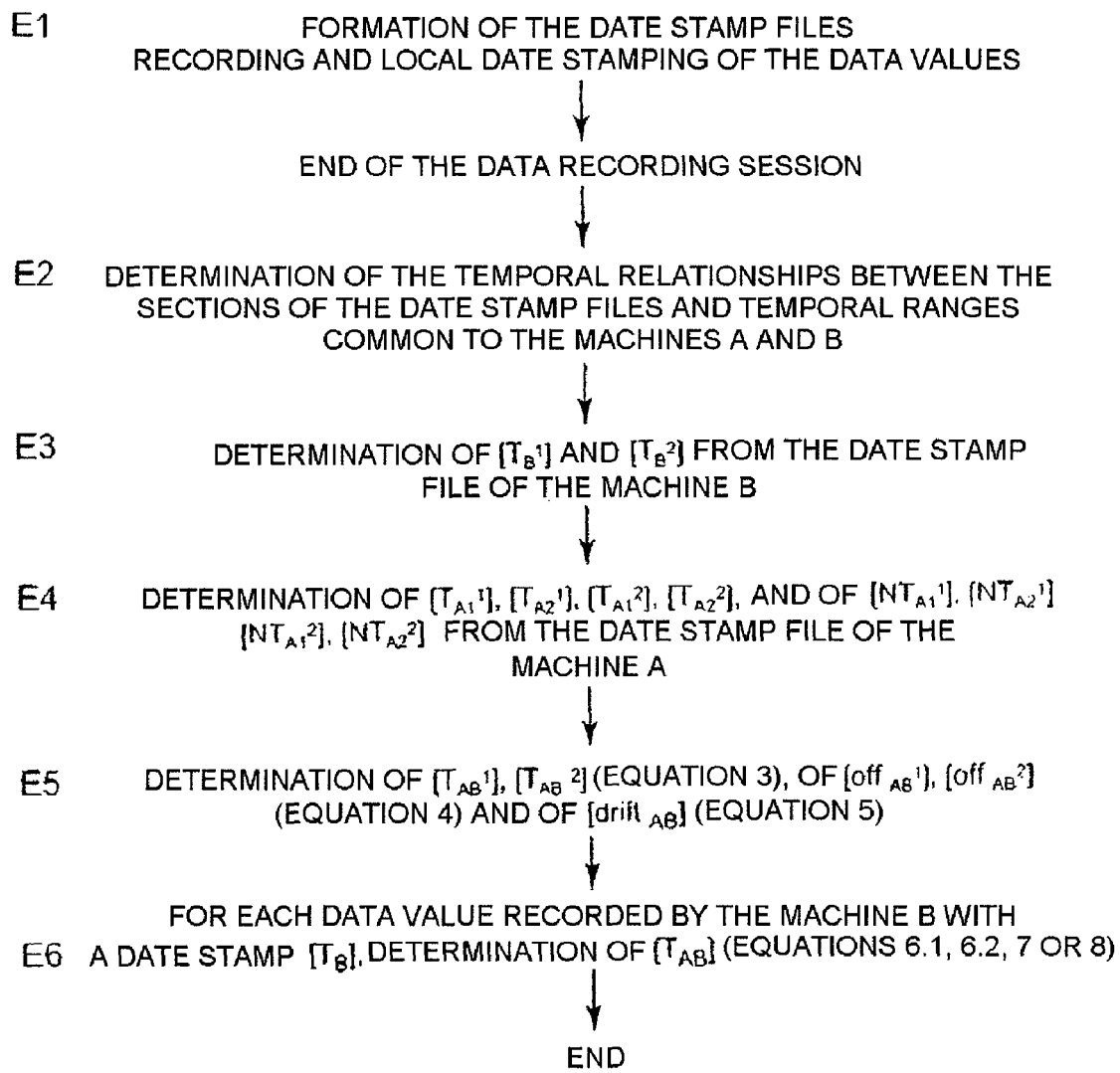
FIG. 6 shows a flow diagram of this method.

In FIG. 6, a flow diagram is illustrated for the method of re-synchronization by intervals of the data of the machine B with respect to the machine A described hereinabove. The process can be repeated for the synchronization of several machines.

The first step (E1) comprises the filling out of the date stamp files FHA and FHB of the machines A and B, together with those of all the other machines of the system (C, in particular) and, in parallel, the recording of the locally date stamped data values. These operations are executed up to the end of the data recording session.

The second step (E2) comprises the determination, by means of the fields NMR and TMR of the files FHA, FHB and FHC, of the temporal relationships between the different sections of these files, and also of the 'common temporal ranges' of the machines A and B, in other words of the periods during which these two machines were connected to one and the same network.

Subsequently, at step E3, two rows LB1 and LB2 of the file FHB are chosen, each one belonging to a 'common temporal range'. These two rows do not need to belong to the same range: as discussed previously, it is preferable that the separation between these two rows be as large as possible. The two readings of the local time of the machine B (TL1, TL2) contained in the rows LB1 and LB2 define the intervals $[T_B^1]$ and $[T_B^2]$.

At step E4, two rows (LA1 and LA2) of the file FHA are determined that belong to the same temporal range as the row LB1 of FHB and are recorded before and after the latter, respectively. In the same way, the rows LA3 and LA4 that 'surround' LB2 are determined.

More synthetically:

$$[T_{A1}^1] \leq [T_B^1] \leq [T_{A2}^1];$$

$$[T_{A1}^2] \leq [T_B^2] \leq [T_{A2}^2]$$

Advantageously, LA1 and LA3 are the last rows recorded before LB1 and LB2, and LA2 and LA2 are the first rows recorded after LB1 and LB2, respectively.

The network times $[NT_{A1}^1]$, $[NT_{A2}^1]$, $[NT_{A1}^2]$ and $[NT_{A2}^2]$ are defined as corresponding to the field TR from the rows LA1-LA4, respectively:

$[NT_{A1}^1]$=TR row LA1

$[NT_{A2}^1]$=TR row LA2

$[NT_{A1}^2]$=TR row LA3

$[NT_{A2}^2]$=TR row LA4

The width of these intervals is given by the discretization δ of the network time.

At step E5, $[T_{AB}^1]$, $[T_{AB}^2]$, $[off_{AB}^1]$, $[off_{AB}^2]$ and $[drift_{AB}]$ are calculated by interpolation, by means of equations 3-5.

Lastly, at step E6, the re-synchronization of all the data values of the machine B (or just of a part of them) is carried out by interpolation or extrapolation, by means of equations 6.1, 6.2, 7 and 8.

A process of re-synchronization of the data according to the flow diagram in FIG. 6 has been tested experimentally by the inventors.

During a first experiment, two computers based on an INTEL® Pentium IV® processor with a clock speed of 1.8 and 2 GHz, respectively, and a RAM memory of 512 MB, equipped with the operating system Microsoft® Windows 2000 Professional® and a FireWire® MindReady® interface with the Sednet 2® API, connected together and to a digital camera UNIBRAIN® Fire-I® via a FireWire® network bus were used. The computers were to record and date stamp the images transmitted by the camera over the network bus; the synchronization was considered to be obtained if the date stamps of the images recorded by the two computers consisted of overlapping intervals. The width of the re-synchronization intervals thus obtained ($[T_{AB}]$, again taking the notation of the example) was 250-300 μs.

A second experiment was carried out following the same protocol, but using two computers based on an INTEL® Pentium III® processor with a clock speed of 800 MHz and RAM memory of 128 and 256 MB, respectively, equipped with Linux RTAI® operating systems and a FireWire® OHCI® interface connected together and to a digital camera UNIBRAIN® Fire-I® via a FireWire® network bus. In this case, resynchronization intervals of 30-50 μs were obtained, thanks to the fact that Linux RTAI® is executed with a real-time sub-kernel, which allows a discretization of the network time of around 5 μs to be attained, versus 130 μs using the Sednet 2® API in the case of Microsoft® Windows 2000 Professional®.

The description presented with reference to FIGS. 3A-6 and to the tables Tab.A, Tab.B and Tab.C relates to an embodiment where the date stamp files are filled out by recording two readings of the clock of each machine and one reading of the network time falling between the two. It is also possible, within the scope of the invention, to perform two readings of the network time and one reading of the local time of each machine, that fall between the two: the algorithm in FIG. 6 is applicable mutatis mutandis. Many other variants and improvements of the method are possible, without straying from the scope of the present invention.

For example, the determination of an offset $[off_{AB}^1]$ (equation 4) requires the use of a pair of readings of the network time, $[NT_{A1}^1]$ and $[NT_{A2}^1]$. In fact, any pair surrounding $[T_B]$ can be chosen, and the result is always an interval $[off_{AB}^1]$ containing, with certainty, the 'true' value $off_{AB\ true}^1$ of the offset (which is impossible to know). If, starting from a plurality of such pairs, a plurality of intervals $[off_{AB}^1]'$, $[off_{AB}^1]''$, etc. is determined, it is known with certainty that $off_{AB\ true}^1 \in [off_{AB}^1]' \cap [off_{AB}^1]'' \cap \ldots$ In such a manner, a narrower interval, and hence a higher precision, is obtained. In the same way, the width of the intervals which represent the drift and the various date stamps $T_{AB}$ can be reduced. The principles of this method, referred to as 'propagation of constraints over the intervals' are disclosed in the article by L. Jaulin, M. Kieffer, O. Dirit and E. Walter cited hereinabove. Indeed, the method of propagation of the constraints has allowed a reduction in the interval width of around 20%-40% to be obtained for the offset ($[off_{AB}]$), and around 20% for the drift ($[drift_{AB}]$).

Another improvement consists in replacing the hypothesis of linear drifts by a hypothesis of linearity by intervals without significant modifications to the algorithm.

A further variant consists in carrying out the synchronization of the data during the operation session of the network: at regular intervals, the synchronization is carried out using the information available, while at the same time continuing to acquire data and to add rows to the date stamp files of the various machines. After each synchronization step, the intersection of the intervals thus obtained with those previously determined is performed.

In the present document, it has always been considered that each machine assigns a date stamp to data values and records them locally. It will however be understood that the case in which the data is locally date stamped by a first machine and then transmitted over the network in order to be recorded by a second machine also forms part of the scope of the invention.

Although, in the example considered hereinabove, the choice was made to synchronize the data values from two machines (A and B) with respect to the local time of one of them (A), the choice could also have been made to synchronize these data values with respect to another monotonic temporal reference, such as the local time of the machine C.

TABLE A

|  | TL1 | TR | TL2 | NMR | TMR |
|---|---|---|---|---|---|
| α1 | 7847371499 | 0002053250 | 0000000033 | A | 7847371792 |
|  | 7848387044 | 0003069125 | 0000000029 | A | 7848387342 |
|  | . . . |  |  |  |  |
|  | 7860580135 | 0015265875 | 0000000012 | A | 7860580402 |
|  | 7861589993 | 0016276000 | 0000000035 | A | 7861590339 |
|  | 0 | 0 | 0 | BUS_RESET | 0 |
| α2 | 7863621113 | 0001457250 | 0000000030 | A | 7863621392 |
|  | 7864636709 | 0002473125 | 0000000030 | A | 7864636991 |
|  | . . . |  |  |  |  |
|  | 7908307691 | 0046157250 | 0000000028 | A | 7908308006 |
|  | 7909323310 | 0047173250 | 0000000029 | A | 7909323615 |
|  | 0 | 0 | 0 | BUS_RESET | 0 |
| α3 | 7911354504 | 0001500125 | 0000000029 | A | 7911354787 |
|  | 7912370110 | 0002516000 | 0000000028 | A | 7912370388 |
|  | . . . |  |  |  |  |
|  | 7922526148 | 0012675125 | 0000000033 | A | 7922526444 |
|  | 7923541829 | 0013691125 | 0000000025 | A | 7923542076 |
|  | 0 | 0 | 0 | BUS_RESET | 0 |
| α4 | 7925572961 | 0001587625 | 0000000029 | B | 8070483980 |
|  | 7926588585 | 0002603375 | 0000000028 | B | 8071499635 |
|  | . . . |  |  |  |  |
|  | 7937760209 | 0013776000 | 0000000029 | B | 8082671426 |
|  | 7938775811 | 0014791625 | 0000000029 | B | 8083687070 |
|  | 0 | 0 | 0 | BUS_RESET | 0 |
| α5 | 7940807022 | 0001060125 | 0000000016 | A | 7940807282 |
|  | 7941822622 | 0002075750 | 0000000013 | A | 7941822884 |
|  | . . . |  |  |  |  |
|  | 7947916246 | 0008170000 | 0000000013 | A | 7947916494 |
|  | 7948931871 | 0009185625 | 0000000029 | A | 7948932165 |
|  | 0 | 0 | 0 | BUS_RESET | 0 |
| α6 | 7950963061 | 0001708500 | 0000000029 | B | 8095874551 |
|  | 7951978665 | 0002724500 | 0000000026 | B | 8096890166 |
|  | . . . |  |  |  |  |
|  | 7957056687 | 0007804000 | 0000000030 | B | 8101968339 |
|  | 7958072288 | 0008819875 | 0000000026 | B | 8102983900 |
|  | 0 | 0 | 0 | BUS_RESET | 0 |
| α7 | 7960103503 | 0001121000 | 0000000028 | A | 7960103794 |
|  | 7961119119 | 0002136875 | 0000000024 | A | 7961119386 |
|  | . . . |  |  |  |  |
|  | 7966197126 | 0007216500 | 0000000028 | A | 7966197419 |
|  | 7967212732 | 0008232375 | 0000000028 | A | 7967213023 |
|  | 0 | 0 | 0 | BUS_RESET | 0 |
| α8 | 7969243956 | 0001133375 | 0000000029 | A | 7969244557 |
|  | 7970259542 | 0002149250 | 0000000030 | A | 7970259820 |
|  | . . . |  |  |  |  |
|  | 8006821287 | 0038722000 | 0000000028 | A | 8006821557 |
|  | 8007836894 | 0039738000 | 0000000029 | A | 8007837177 |
|  | 0 | 0 | 0 | BUS_RESET | 0 |

TABLE B

|    | TL1        | TR         | TL2        | NMR       | TMR        |
|----|------------|------------|------------|-----------|------------|
| β1 | 8022330108 | 0002126375 | 0000000066 | B         | 8022331080 |
|    | 8023345715 | 0003142125 | 0000000042 | B         | 8023346654 |
|    | ...        |            |            |           |            |
|    | 8030533201 | 0010330625 | 0000000037 | B         | 8030534217 |
|    | 8031564504 | 0011362125 | 0000000048 | B         | 8031565573 |
|    | 0          | 0          | 0          | BUS_RESET | 0          |
| β2 | 8033642626 | 0001864375 | 0000000048 | C         | 0301503876 |
|    | 8034673830 | 0002895625 | 0000000025 | C         | 0302534856 |
|    | ...        |            |            |           |            |
|    | 8049111328 | 0017335250 | 0000000028 | C         | 0316972351 |
|    | 8050142610 | 0018366750 | 0000000038 | C         | 0318003740 |
|    | 0          | 0          | 0          | BUS_RESET | 0          |
| β3 | 8052220716 | 0001644125 | 0000000042 | B         | 8052221861 |
|    | 8053251969 | 0002675500 | 0000000052 | B         | 8053253220 |
|    | 8054283215 | 0003706875 | 0000000038 | B         | 8054284434 |
|    | 0          | 0          | 0          | BUS_RESET | 0          |
| β4 | 8056377004 | 0001603625 | 0000000040 | A         | 7911467875 |
|    | 8057423861 | 0002650750 | 0000000076 | A         | 7912514861 |
|    | ...        |            |            |           |            |
|    | 8066845695 | 0012073875 | 0000000028 | A         | 7921936130 |
|    | 8067892623 | 0013121000 | 0000000079 | A         | 7922983134 |
|    | 0          | 0          | 0          | BUS_RESET | 0          |
| β5 | 8069986326 | 0001090375 | 0000000023 | B         | 8069987185 |
|    | 8071017587 | 0002121750 | 0000000044 | B         | 8071018683 |
|    | ...        |            |            |           |            |
|    | 8083392603 | 0014497625 | 0000000033 | B         | 8083393725 |
|    | 8084423819 | 0015528875 | 0000000027 | B         | 8084424600 |
|    | 0          | 0          | 0          | BUS_RESET | 0          |
| β6 | 8086501954 | 0001835750 | 0000000035 | B         | 8086502686 |
|    | 8087533237 | 0002867125 | 0000000088 | B         | 8087534237 |
|    | ...        |            |            |           |            |
|    | 8092689512 | 0008024125 | 0000000056 | B         | 8092690667 |
|    | 8093720757 | 0009055625 | 0000000076 | B         | 8093721770 |
|    | 0          | 0          | 0          | BUS_RESET | 0          |
| β7 | 8095798825 | 0001624750 | 0000000031 | B         | 8095799819 |
|    | 8096830098 | 0002656125 | 0000000045 | B         | 8096831121 |
|    | ...        |            |            |           |            |
|    | 8101986351 | 0007813125 | 0000000021 | B         | 8101987503 |
|    | 8103017580 | 0008844500 | 0000000037 | B         | 8103018294 |
|    | 0          | 0          | 0          | BUS_RESET | 0          |
| β8 | 8105111335 | 0001208875 | 0000000026 | A         | 7960200939 |
|    | 8106158227 | 0002256000 | 0000000027 | A         | 7961247922 |
|    | ...        |            |            |           |            |
|    | 8111392602 | 0007491125 | 0000000032 | A         | 7966482229 |
|    | 8112439473 | 0008538125 | 0000000043 | A         | 7967529242 |
|    | 0          | 0          | 0          | BUS_RESET | 0          |
| β9 | 8114533236 | 0001501875 | 0000000056 | B         | 8114534120 |
|    | 8115564503 | 0002533375 | 0000000033 | B         | 8115565530 |
|    | ...        |            |            |           |            |
|    | 8126908239 | 0013878750 | 0000000078 | B         | 8126909116 |
|    | 8127939466 | 0014910125 | 0000000029 | B         | 8127940507 |
|    | 0          | 0          | 0          | BUS_RESET | 0          |

TABLE C

|    | TL1        | TR         | TL2        | NMR       | TMR        |
|----|------------|------------|------------|-----------|------------|
| γ1 | 0245148935 | 0001123529 | 0000000016 | C         | 0245149153 |
|    | 0246149331 | 0002124009 | 0000000014 | C         | 0246149485 |
|    | ...        |            |            |           |            |
|    | 0256150754 | 0012126272 | 0000000015 | C         | 0256150859 |
|    | 0257150892 | 0013126494 | 0000000015 | C         | 0257150996 |
|    | 0          | 0          | 0          | BUS_RESET | 0          |
| γ2 | 0259151823 | 0001063357 | 0000000015 | A         | 7846381976 |
|    | 0260152246 | 0002063865 | 0000000015 | A         | 7847382391 |
|    | ...        |            |            |           |            |
|    | 0273269802 | 0015182521 | 0000000014 | A         | 7860499923 |
|    | 0274272003 | 0016184806 | 0000000015 | A         | 7861502121 |
|    | 0          | 0          | 0          | BUS_RESET | 0          |
| γ3 | 0276282222 | 0001348304 | 0000000015 | C         | 0276282326 |
|    | 0277282343 | 0002348510 | 0000000015 | C         | 0277282446 |
|    | ...        |            |            |           |            |
|    | 0298284888 | 0023352815 | 0000000015 | C         | 0298284991 |
|    | 0299284994 | 0024353005 | 0000000015 | C         | 0299285096 |

TABLE C-continued

|  | TL1 | TR | TL2 | NMR | TMR |
|---|---|---|---|---|---|
|  | 0 | 0 | 0 | BUS_RESET | 0 |
| γ4 | 0301285283 | 0001656149 | 0000000015 | C | 0301285386 |
|  | 0302285388 | 0002656338 | 0000000015 | C | 0302285493 |
|  | ... | | | | |
|  | 0317286883 | 0017659090 | 0000000014 | C | 0317286987 |
|  | 0318286979 | 0018659270 | 0000000015 | C | 0318287084 |
|  | 0 | 0 | 0 | BUS_RESET | 0 |
| γ5 | 0320287256 | 0001859382 | 0000000015 | C | 0320287363 |
|  | 0321287352 | 0002859562 | 0000000015 | C | 0321287454 |
|  | ... | | | | |
|  | 0335288551 | 0016861934 | 0000000014 | C | 0335288653 |
|  | 0336288634 | 0017862101 | 0000000015 | C | 0336288737 |
|  | 0 | 0 | 0 | BUS_RESET | 0 |
| γ6 | 0338293102 | 0001537616 | 0000000015 | B | 8070433663 |
|  | 0339303052 | 0002547650 | 0000000015 | B | 8071443653 |
|  | ... | | | | |
|  | 0351413246 | 0014658859 | 0000000015 | B | 8083554023 |
|  | 0352423266 | 0015668964 | 0000000015 | B | 8084564099 |
|  | 0 | 0 | 0 | BUS_RESET | 0 |
| γ7 | 0354433721 | 0001916670 | 0000000015 | A | 7941663622 |
|  | 0355447719 | 0002930752 | 0000000014 | A | 7942677620 |
|  | ... | | | | |
|  | 0360493391 | 0007976846 | 0000000014 | A | 7947723296 |
|  | 0361503412 | 0008986952 | 0000000014 | A | 7948733336 |
|  | 0 | 0 | 0 | BUS_RESET | 0 |
| γ8 | 0363515461 | 0001490559 | 0000000014 | B | 8095656411 |
|  | 0364523458 | 0002498640 | 0000000014 | B | 8096664477 |
|  | ... | | | | |
|  | 0370583555 | 0008559245 | 0000000014 | B | 8102724637 |
|  | 0371593569 | 0009569344 | 0000000015 | B | 8103734677 |
|  | 0 | 0 | 0 | BUS_RESET | 0 |
| γ9 | 0373603746 | 0001851003 | 0000000015 | C | 0373603849 |
|  | 0374603801 | 0002851142 | 0000000015 | C | 0374603904 |
|  | ... | | | | |
|  | 0394604775 | 0022853791 | 0000000015 | C | 0394604877 |
|  | 0395604811 | 0023853910 | 0000000015 | C | 0395604914 |
|  | 0 | 0 | 0 | BUS_RESET | 0 |

The invention claimed is:

1. A method for establishing a correspondence by intervals ($[T_B]$, $[T_{AB}]$) between the time ($T_B$) indicated by a first monotonic clock ($H_B$) and the time ($T_A$) indicated by a second clock ($H_A$), also monotonic, characterized in that it operates, over at least one temporal range (P1, P4), a first temporal reference (NT) common to the first and to the second clock and monotonic over said range, and in that said method comprises the steps of:

a) determining a first temporal interval ($[T_B^1]$) bounded by a first pair of time values ($T_B$) of the first clock ($H_B$) and belonging to a first temporal range (P1) over which the first temporal reference (NT) common to the first and to the second clock exists;
   b) determining a second temporal interval ($[T_B^2]$) bounded by a second pair of time values ($T_B$) of the first clock ($H_B$) and belonging to a second temporal range (P4) over which the first temporal reference (NT) common to the first and to the second clock exists;
   c) determining, by means of the common temporal reference (NT), a third temporal interval ($[T_{AB}^1]$), bounded by a first pair of time values ($T_A$) of the second clock ($H_A$), and containing the first temporal interval ($[T_B^1]$);
   d) determining, by means of the common temporal reference (NT), a fourth temporal interval ($[T_{AB}^2]$), bounded by a second pair of time values ($T_A$) of the second clock ($H_A$), and containing the second temporal interval ($[T_B^2]$);
   e) for any given fifth temporal interval ($[T_B]$) bounded by a third pair of time values ($T_B$) of the first clock ($H_B$), calculating a sixth temporal interval ($[T_{AB}]$), bounded by a third pair of time values ($T_A$) of the second clock ($H_A$), and containing said fifth temporal interval ($[T_B]$), the calculation being performed by interpolation or extrapolation using said first ($[T_B^1]$), second ($[T_B^2]$), third ($[T_{AB}^1]$) and fourth ($[T_{AB}^2]$) intervals;

wherein at least the steps a) through e) are implemented by a computer.

2. The method as claimed in claim 1, wherein the step c) comprises the operations of:

c1) determining a seventh ($[T_{A1}^1]$) and an eighth ($[T_{A2}^1]$) temporal interval, bounded by a fourth and fifth pair of time values ($T_A$) of the second clock ($H_A$), respectively, and belonging to the first temporal range (P1), such that the first temporal interval ($[T_B^1]$) falls in the range between said seventh ($[T_{A1}^1]$) and eighth ($[T_{A2}^1]$) temporal intervals;
   c2) determining a first ($NT_B^1$), second ($NT_{A1}^1$) and third ($NT_{A2}^1$) value of the first common temporal reference (NT), included in said first ($[T_B^1]$), seventh ($[T_{A1}^1]$) and eighth ($[T_{A2}^1]$) temporal intervals, respectively;
   c3) calculating, by interpolation, said third ($[T_{AB}^1]$) temporal interval, using said first ($[T_B^1]$), seventh ($[T_{A1}^1]$) and eighth ($[T_{A2}^1]$) temporal intervals and said first ($NT_B^1$), second ($NT_{A1}^1$) and third ($NT_{A2}^1$) values of the first common temporal reference (NT);

and wherein the step d) comprises the operations of:

d1) determining a ninth ($[T_{A1}^2]$) and a tenth ($[T_{A2}^2]$) temporal interval, bounded by a sixth and seventh pair of time values ($T_A$) of the second clock ($H_A$), respectively, and belonging to the second temporal range (P4), such that the second temporal interval ($[T_B^2]$) falls in the range between said ninth ($[T_{A1}^2]$) and tenth ($[T_{A2}^2]$) intervals;

d2) determining a fourth ($NT_B^2$), fifth ($NT_{A1}^2$) and sixth ($NT_{A2}^2$) value of the first common temporal reference (NT), included in said second ($[T_B^2]$), ninth ($[T_{A1}^2]$) and tenth ($[T_{A2}^2]$) temporal intervals, respectively;

d3) calculating, by interpolation, said fourth ($[T_{AB}^2]$) temporal intervals, using said second ($[T_B^2]$), ninth ($[T_{A1}^2]$) and tenth ($[T_{A2}^2]$) temporal intervals and said fourth ($NT_B^2$), fifth ($NT_{A1}^2$) and sixth ($NT_{A2}^2$) values of the first common temporal reference (NT).

3. The method as claimed in claim 1, wherein the step c) comprises the operations of:

c1) determining a seventh ($T_{A1}^1$) and an eighth ($T_{A2}^1$) time value ($T_A$) of the second clock ($H_A$) belonging to the first temporal range (P1), such that said first temporal interval ($[T_B^1]$) falls in the range between said seventh ($T_{A1}^1$) and eighth ($T_{A2}^1$) values;

c2) determining a first ($[NT_B^1]$), second ($[NT_{A1}^1]$) and third ($[NT_{A2}^1]$) interval of values of the first common temporal reference (NT), comprising said first temporal interval ($[T_B^1]$) and said seventh ($T_{A1}^1$) and eighth ($T_{A2}^1$) time values ($T_A$) of the second clock ($H_A$), respectively;

c3) calculating, by interpolation, said third ($[T_{AB}^1]$) temporal interval, using said first interval ($[T_B^1]$) of time values ($T_B$) of the first clock ($H_B$), said seventh ($T_{A1}^1$) and eighth ($T_{A2}^1$) time values ($T_A$) of the second clock ($H_A$) and said first ($[NT_B^1]$), second ($[NT_{A1}^1]$) and third ($[NT_{A2}^1]$) intervals of values of the first common temporal reference (NT);

and wherein the step d) comprises the operations of:

d1) determining a ninth ($T_{A1}^2$) and a tenth ($T_{A2}^2$) time values ($T_A$) of the second clock ($H_A$) belonging to the second temporal range (P4), such that said second temporal interval ($[T_B^2]$) falls in the range between said ninth ($T_{A1}^2$) and tenth ($T_{A2}^2$) values;

d2) determining fourth ($[NT_B^2]$), fifth ($[NT_{A1}^2]$) and sixth ($[NT_{A2}^2]$) intervals of values of the first common temporal reference (NT), comprising said second ($[T_B^2]$) temporal interval and said ninth ($T_{A1}^2$) and tenth ($T_{A2}^2$) time values ($T_A$) of the second clock ($H_A$);

d3) calculating, by interpolation, said fourth ($[T_{AB}^2]$) temporal interval, using said second interval ($[T_B^2]$) of time values ($T_B$) of the first clock ($H_B$), said ninth ($T_{A1}^1$) and tenth ($T_{A2}^1$) time values ($T_A$) of the second clock ($H_A$) and said fourth ($[NT_B^1]$), fifth ($[NT_{A1}^1]$) and sixth ($[NT_{A2}^1]$) intervals of values of the first common temporal reference (NT).

4. The method as claimed in claim 2, wherein the operation c3) is carried out by replacing said first ($NT_B^1$), second ($NT_{A1}^1$) and third ($NT_{A2}^1$) values of the common temporal reference (NT) by temporal intervals ($[NT_B^1]$, $[NT_{A1}^1]$, $[NT_{A2}^1]$) whose width is equal to the discretization of the first common temporal reference (NT) over the first temporal range (P1), and wherein the operation d3) is carried out by replacing said fourth ($NT_B^2$), fifth ($NT_{A1}^2$) and sixth ($NT_{A2}^2$) values of the common temporal reference (NT) by temporal intervals ($[NT_B^2]$, $[NT_{A1}^2]$, $[NT_{A2}^2]$) whose width is equal to the discretization of the first common temporal reference (NT) over the second temporal range (P4).

5. The method as claimed in claim 3, wherein the operations c3) and d3) are carried out by replacing said seventh ($T_{A1}^1$), eighth ($T_{A2}^1$), ninth ($T_{A1}^2$) and tenth ($T_{A2}^2$) time values ($T_A$) of the second clock ($H_A$) by temporal intervals ($[T_{A1}^1]$, $[T_{A1}^2]$, $[T_{A2}^1]$, $[T_{A2}^2]$) whose width is equal to the discretization of the time ($T_A$) of the second clock ($H_A$).

6. The method as claimed in claim 2 wherein, during the temporal range or ranges (P1, P4) over which a first common temporal reference (NT) exists, a first reading of the first clock (TL1-FHB) is recorded several times, followed by a reading of the first common temporal reference (TR-FHB) and, subsequently, by a second reading of the first clock (TL2-FHB), and independently, a first reading of the second clock (TL1-FHA) is recorded, also several times, followed by a reading of the first common temporal reference (TR-FHA) and then by a second reading of the second clock (TL2-FHA), and wherein the operations c1), c2), c3), d1), d2) and d3) are performed using these recordings.

7. The method as claimed in claim 3 wherein, during the temporal range or ranges (P1, P4) over which a first common temporal reference (NT) exists, a first reading of the first common temporal reference (NT) is recorded several times, followed by a reading of the first clock ($H_B$) and, subsequently, by a second reading of the first common temporal reference (NT), and independently, a first reading of the first common temporal reference (NT) is recorded, also several times, followed by a reading of the second clock ($H_A$) and then by a second reading of the first common temporal reference (NT), and wherein the operations c1), c2), c3), d1), d2) and d3) are performed using these recordings.

8. The method as claimed in claim 1 wherein the step e) is carried out by linear interpolation by intervals or by linear extrapolation by intervals.

9. The method as claimed in claim 2 wherein the operations c3) and d3) are performed by linear interpolation by intervals.

10. The method as claimed in claim 1 wherein the first temporal reference (NT) common to the first and to the second clock exists over at least two separate temporal ranges (P1, P4) and can comprise a rupture of monotonicity from one temporal range to the other, a second monotonic common temporal reference (TMR-NMR) being used in order to resolve the ambiguities resulting from the non-monotonicity of the first common temporal reference (NT).

11. The method as claimed in claim 4 wherein, during the temporal range or ranges (P1, P4) over which a first common temporal reference (NT) exists, a first reading of the first clock (TL1-FHB) is recorded several times, followed by a reading of the first common temporal reference (TR-FHB) and, subsequently, by a second reading of the first clock (TL2-FHB), and independently, a first reading of the second clock (TL1-FHA) is recorded, also several times, followed by a reading of the first common temporal reference (TR-FHA) and then by a second reading of the second clock (TL2-FHA), and wherein the operations c1), c2), c3), d1), d2) and d3) are performed using these recordings.

12. The method as claimed in claim 5 wherein, during the temporal range or ranges (P1, P4) over which a first common temporal reference (NT) exists, a first reading of the first common temporal reference (NT) is recorded several times, followed by a reading of the first clock ($H_B$) and, subsequently, by a second reading of the first common temporal reference (NT), and independently, a first reading of the first common temporal reference (NT) is recorded, also several times, followed by a reading of the second clock ($H_A$) and then by a second reading of the first common temporal reference (NT), and wherein the operations c1), c2), c3), d1), d2) and d3) are performed using these recordings.

13. A method for synchronizing data recorded and date stamped by a first machine (B), having a first clock ($H_B$), with respect to the local time of a second machine (A), having a second clock ($H_A$), wherein the date stamping is carried out by associating with each data value recorded by the first machine a fifth temporal interval ($[T_B]$), bounded by a third pair of time values ($T_B$) of the first clock ($H_B$), and the synchronization is performed by determining, by a method as claimed in claim 1, a sixth temporal interval ($[T_{AB}]$), bounded by a third pair of time values ($T_A$) of the second clock ($H_A$) and containing said fifth temporal interval ($[T_B]$).

14. The method as claimed in claim 13 wherein the first common temporal reference (NT) is supplied by a clock ($H_{BUS}$) of a synchronous bus (BUS) which connects, at least temporarily, said first and second machines.

15. The method as claimed in claim 13, which is broken down into a first sub-process for recording clock readings carried out locally by each machine whose data it is desired to synchronize, and a second process for the synchronization itself, effected by a machine toward which all the data has been transferred after the termination of the data recording session.

* * * * *